United States Patent
Wu et al.

(10) Patent No.: US 8,923,027 B2
(45) Date of Patent: Dec. 30, 2014

(54) FIVE-LEVEL DC-AC CONVERTER

(75) Inventors: Chin-Chang Wu, Kaohsiung (TW);
Wen-Jung Chiang, Kaohsiung (TW);
Ming-Pin Mai, Kaohsiung (TW);
Chia-Wei Chou, Kaohsiung (TW);
Mao-Jang He, Kaohsiung (TW)

(73) Assignee: Ablerex Electronics Co., Ltd., Xindian Dist., New Taipei (TW)

( * ) Notice: Subject to any disclaimer, the term of this patent is extended or adjusted under 35 U.S.C. 154(b) by 341 days.

(21) Appl. No.: 13/371,895

(22) Filed: Feb. 13, 2012

(65) Prior Publication Data
US 2013/0033912 A1 Feb. 7, 2013

(30) Foreign Application Priority Data
Aug. 4, 2011 (TW) .............................. 100127698 A

(51) Int. Cl.
*H02M 7/5387* (2007.01)
*H02M 7/483* (2007.01)

(52) U.S. Cl.
CPC ...... *H02M 7/483* (2013.01); *H02M 2007/4835* (2013.01)
USPC .......................................................... 363/132

(58) Field of Classification Search
CPC .......................... H02M 7/483; H02M 7/5387
USPC .................. 363/16, 17, 97, 98, 109, 131, 132
See application file for complete search history.

(56) References Cited

U.S. PATENT DOCUMENTS 7,138,730 B2 * 11/2006 Lai .................................. 307/82
8,462,528 B2 * 6/2013 Kajouke et al. ............... 363/127

* cited by examiner

*Primary Examiner* — Adolf Berhane
*Assistant Examiner* — Yemane Mehari
(74) *Attorney, Agent, or Firm* — Charles E. Baxley

(57) ABSTRACT

A five-level DC-AC converter includes a capacitor set and a full-bridge circuit. The capacitor set contains two DC capacitors, a power electronic switch and two diodes. When the power electronic switch is turned on/off, the two DC capacitors are connected in series/parallel to provide a two-level DC voltage to the full-bridge circuit. The full-bridge circuit further converts the two-level DC voltage to output a voltage with three voltage levels in the positive half cycle and three voltage levels in the negative half cycle. This achieves the goal of using five power electronic switches to convert DC power into AC power with five voltage levels.

10 Claims, 4 Drawing Sheets

FIVE-LEVEL DC-AC CONVERTER

BACKGROUND OF THE INVENTION

1. Field of the Invention

The invention relates to a five-level DC-AC converter and, in particular, to a five-level DC-AC converter with a simpler circuit configuration and a lower component cost.

2. Description of Related Art

Energy development and applications are the important topics in the world. Many countries make efforts to find new energy sources or renewable energy in view of depletion of fossil energy someday. In line with environmental protection issues, the renewable energy includes solar power, wind power, etc. Such energy sources use the natural energy and convert it into electric power. Within the devices that convert the natural energy into electric power, DC-AC converter is an indispensible component.

The general power system is based on AC power. The DC-AC converter can conveniently convert the DC power output by various generators into AC power and feed the AC power into the power system for supplying power. Conventionally, the DC-AC converter is a two-level or a three-level converter implemented by half-bridge power converter or full-bridge power converter. Recently, multi-level DC-AC converters have been developed.

With reference to FIG. 1, a single-phase DC-AC converter is implemented using a single-phase three-level diode-clamped power converter. The single-phase three-level diode-clamped power converter includes two DC capacitors 50 and 51, two half-bridge circuits 53 and 54, two diodes 55 and 56.

Two DC capacitors 50 and 51 are connected in series, and the two ends of the two DC capacitors 50 and 51 are connected to a DC bus 52, providing V$^+$ and V$^-$ terminals connecting to an external DC power source.

The two half-bridge circuits 53 and 54, comprise two power electronic switches connected in series, are connected in series and then further connected to the DC bus 52. Serial connection nodes of two power electronic switches in half-bridge circuits 53 and 54 are connected to the serial connection node of the two DC capacitors 50 and 51 through diodes 55 and 56, respectively. A serial connection node of the two half-bridge circuits 53 and 54 is connected to an inductor. The inductor and the serial connection node of the two DC capacitors 50 and 51 are connected to an AC output port 57.

The single-phase three-level diode-clamped DC-AC power converter converts the DC voltage on the two DC capacitors 50 and 51 into AC voltage via turning on or off the power electronic switches of two half-bridge circuits 53 and 54. The voltage variation caused by each switching operating of the power electronic switches is equal to the voltage of one DC capacitor 50 or 51. The output AC voltage thus has variations of three levels. When the load is light, the voltages of the two DC capacitors 50 and 51 are not easy to be balanced. Therefore, the control of single-phase three-level diode-clamped power converter is complicated when the voltage balance of the two DC capacitors 50 and 51 is considered to obtain a stable AC output.

With reference to FIG. 2, a single-phase three-level flying-capacitor power converter is used as a single-phase three-level DC-AC converter. It is mainly composed of two DC capacitors 60 and 61 and two half-bridge switch circuits 62 and 63. The two DC capacitors 60 and 61 are connected in series. The two half-bridge circuits 62 and 63, comprise two power electronic switches connected in series, are also connected in series. However, the serial connection nodes of the two power electronic switches in the two half-bridge circuits 62 and 63 are connected with another DC capacitor 64. A serial connection node of the two half-bridge circuits 62 and 63 is connected to an inductor. The inductor and the serial connection node of the two DC capacitors 60 and 61 are connected to an AC output port 65. Its circuit operation is basically the same as the above-mentioned diode-clamped power converter. However, when controlling the two half-bridge circuits 62 and 63, it is necessary to take into account the charging and discharging of the DC capacitors 60, 61 and 64 in order to regulate their voltages. Thus, the control of the single-phase three-level flying-capacitor power converter is complicated.

Apparently, the circuit configuration and the switching control for the power electronic switches of a higher-level DC-AC converter will be more complicated. With reference to FIG. 3, a five-level DC-AC converter includes two DC capacitors 70 and 71 and two full-bridge circuits 72 and 73. The two DC capacitors 70 and 71 are connected to two DC buses 701 and 702. The DC bus 701 provides V1$^+$ and V1$^-$ terminals, and the DC bus 702 provides V2$^+$ and V2$^-$ terminals. Accordingly, two DC power sources are required. The two full-bridge circuits 72 and 73 are connected in parallel with the corresponding DC capacitors 70 and 71. One output node of the two full-bridge circuits 72 and 73 are connected together. The other node of full-bridge circuit 72 is connected to an inductor. The inductor and the other node of full-bridge circuit 73 are connected to an AC output port 74.

According to the above-mentioned circuit structure, to output the AC power with five voltage levels, various DC capacitors 70 and 71 have to connect to V$_1^+$, V$_1^-$/V$_2^+$, V$_2^-$ terminals of the DC power sources, in addition to using two full-bridge circuits 72 and 73. In short, the five-level DC-AC converter has to use two full-bridge circuits 72 and 73, including eight power electronic switches in total. In addition to the complicated circuit design and high cost, the control of the power electronic switches in the two full-bridge circuits 72 and 73 becomes more complicated under the consideration for balancing the voltages of two DC capacitors 70 and 71.

SUMMARY OF THE INVENTION

One objective of the invention is to provide a five-level DC-AC converter with a simpler circuit and to assure the voltages of two DC capacitors to be equal. To achieve the objective, the five-level DC-AC converter includes a capacitor set, a full-bridge circuit and a controller.

The capacitor set includes two DC capacitors, a power electronic switch and two diodes. The power electronic switch is connected between two DC capacitors. One DC capacitor is connected to the positive terminal and the other DC capacitor is connected to the negative terminal of a DC bus. The anode of one of the diodes connects to a serial connection node between the power electronic switch and one of the DC capacitors, and the cathode of this diode connects to the positive terminal of the DC bus. The anode of the other diode connects to the negative terminal of the DC bus, and the cathode of this diode connects to the serial connection node between the power electronic switch and the other DC capacitor. Both ends of the two DC capacitors connect to a power source circuit, respectively, where the power source circuit connects to a DC power source.

The full-bridge circuit connects between the positive and negative terminals of the DC bus and contains a first half-bridge circuit and a second half-bridge circuit connected in parallel. Both the first half-bridge circuit and the second half-bridge circuit consist of two power electronic switches connected in series. The serial connection nodes of the power electronic switches in the first and second half-bridge circuits connect to an AC power output port through a filter circuit.

The controller connects to the power electronic switches of the capacitor set and the full-bridge circuit. The power electronic switches of the capacitor set and the full-bridge circuit are controlled by according to the voltage of the AC source. The five-level DC-AC converter thus generates an AC voltage with three levels (including zero voltage) during each half cycle of the AC source on the output of full bridge circuit thereof.

The invention mainly controls the on/off of the power electronic switches of the capacitor set so that the two DC capacitors are connected in series or parallel by co-operating the two diodes, thereby rendering two voltage levels. By controlling the power electronic switches of the full-bridge circuit, the output of full bridge circuit then alternately outputs an AC voltage, with three voltage levels (including zero voltage) in the positive half cycle and another three voltage levels (including zero voltage) in the negative half cycle. Therefore, the controller controls five power electronic switches to convert DC power into AC power with five voltage levels for output. In addition to simplifying the circuit and lowering the cost, the invention is also easier to regulate the voltages of two DC capacitors to be equal.

DETAILED DESCRIPTION OF THE PREFERRED EMBODIMENT

Figures 1, 2, 3:
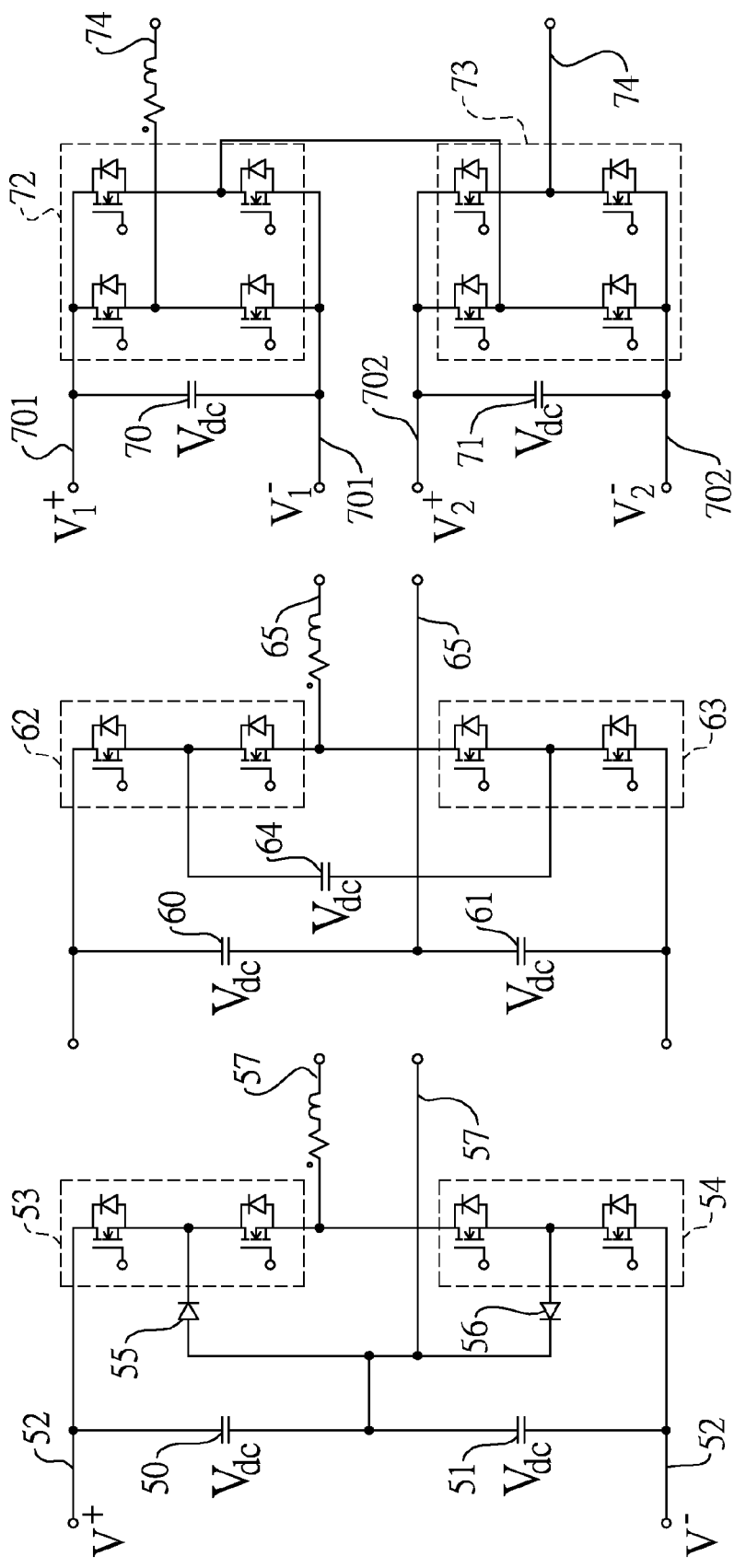
FIG. 1 is a circuit diagram of a conventional single-phase three-level DC-AC converter.
FIG. 2 is a circuit diagram of another conventional single-phase three-level DC-AC converter.
FIG. 3 is a circuit diagram of a conventional five-level DC-AC converter.
Figure 4:
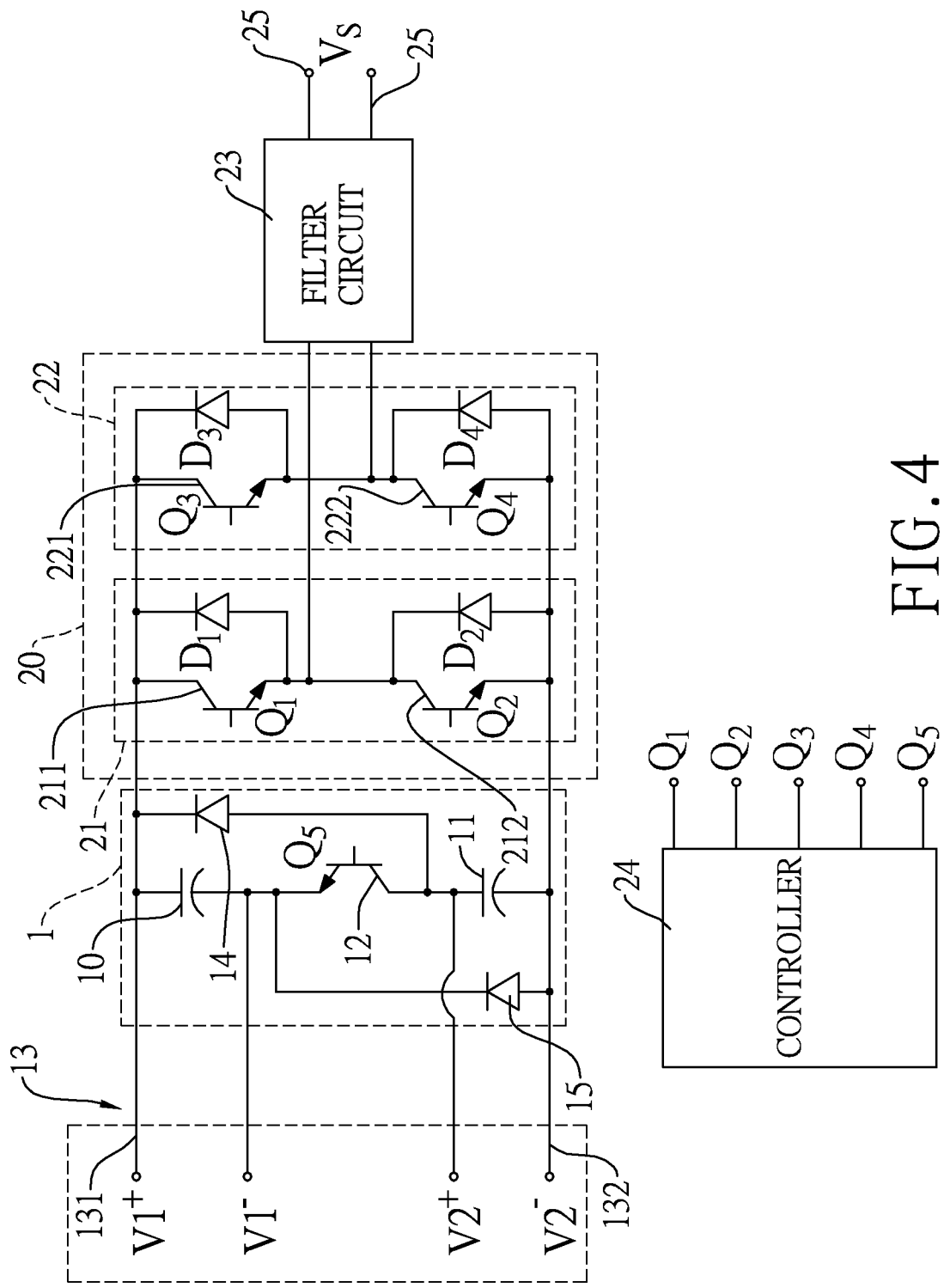
FIG. 4 is a circuit diagram in accordance with the present invention.

With reference to FIG. 4, a five-level DC-AC converter of the present invention includes a capacitor set 1, a full-bridge circuit 20 and a controller 24.

The capacitor set 1 comprises two DC capacitors 10 and 11, a power electronic switch 12 and two diodes 14 and 15. A power electronic switch 12 is connected between DC capacitors 10 and 11. The DC capacitor 10 is connected to the positive terminal 131 of a DC bus 13 and the DC capacitor 11 is connected to the negative terminal 132 of the DC bus 13. Both ends of the DC capacitors 10 and 11 are connected to a power source circuit, respectively. The power source circuit connects to a DC power source and provides electric power to the two DC capacitors 10 and 11. In this embodiment, the DC capacitors 10 and 11 have the same capacitance. The power electronic switch 12 is an IGBT, MOSFET or the other controllable power electronic switch. The anode of the diode 14 connects to a connection node at which the power electronic switch 12 and the DC capacitor 11 are connected together. The cathode of the diode 14 connects to the positive terminal 131 of the DC bus 13. The anode of the diode 15 connects to the negative terminal 132 of the DC bus 13, and the cathode thereof connects to a connection node at which the power electronic switch 12 and the DC capacitor 10 are connected together.

Figure 5B:
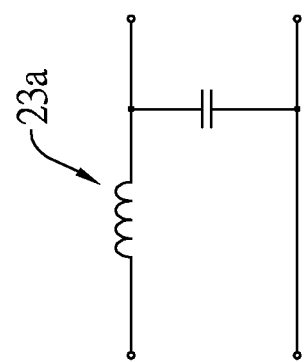
FIG. 5B is a circuit diagram of another preferred embodiment of the filter circuit in accordance with the present invention.
Figure 5A:
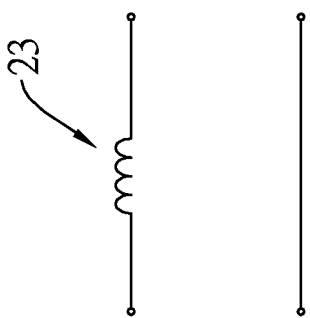
FIG. 5A is a circuit diagram of the filter circuit in accordance with the present invention.

The full-bridge circuit 20 connects between the positive terminal 131 and the negative terminal 132 of the DC bus 13 and comprises a first half-bridge circuit 21 and a second half-bridge circuit 22 connected in parallel. The first half-bridge circuit 21 includes an upper power electronic switch 211 and a lower power electronic switch 212 connected in series. The second half-bridge circuit 22 includes an upper power electronic switch 221 and a lower power electronic switch 222 connected in series. Two serial connection nodes of the two power electronic switches of the first and second half-bridge circuits 21 and 22 are connected to an AC power output port 25 through a filter circuit 23. The AC power output port 25 connects to an AC source $V_S$. With reference to FIG. 5A, the filter circuit 23 is a first-order low-pass filter and includes an inductor. Alternatively, as shown in FIG. 5B, the filter circuit 23a can also be a second-order low-pass filter and includes an inductor and a capacitor. Besides, each of power electronic switches 211, 212, 221 and 222 is an IGBT, MOSFET or the other controllable power electronic switch, and each power electronic switch is connected in parallel with an associated diode D1-D4.

The controller 24 is connected to a control terminal Q5 of the power electronic switch 12 of the capacitor set 1 and control terminals Q1-Q4 of the power electronic switches 211, 212, 221 and 222 of the first and second half-bridge circuits 21 and 22. In each half cycle of the AC source, there are three levels of voltage, including the zero voltage.

Figure 6:
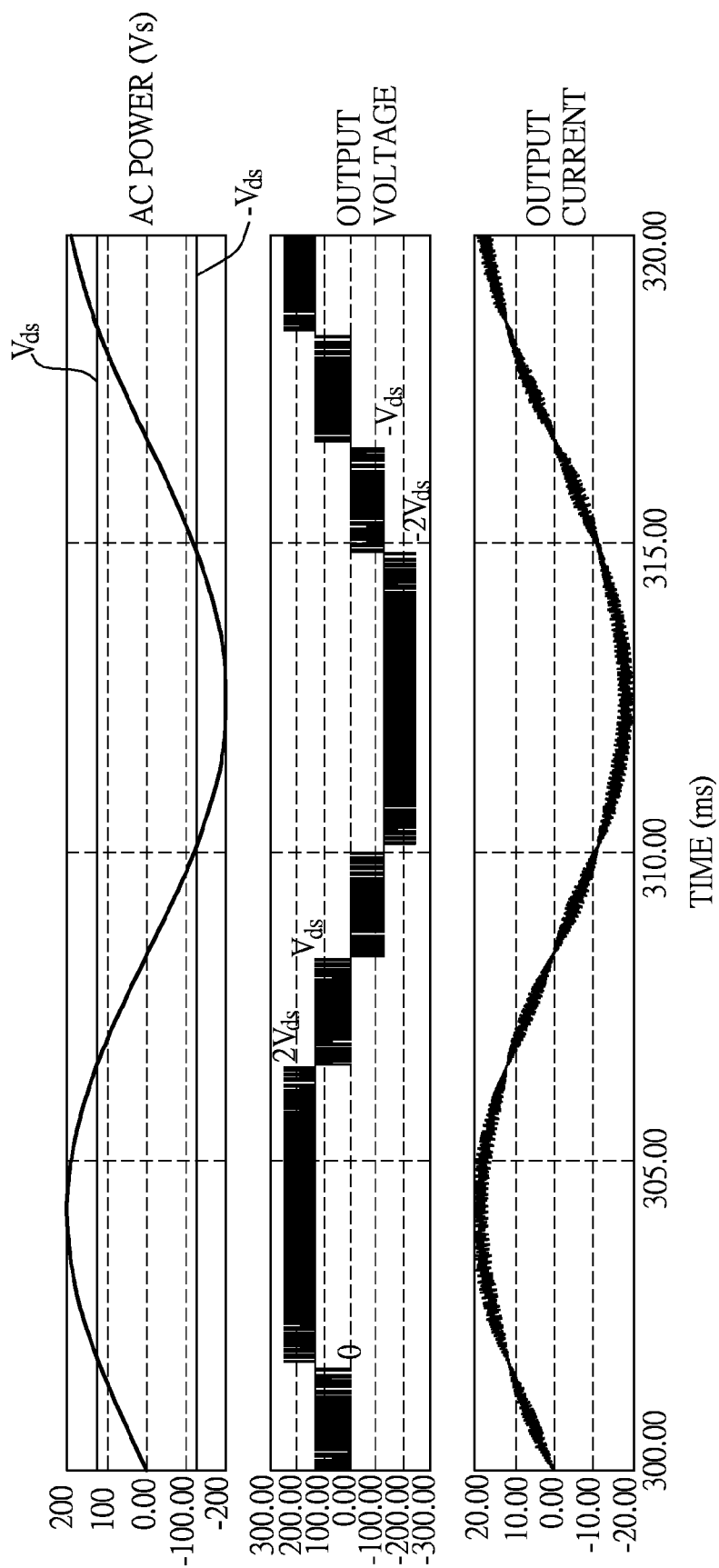
FIG. 6 shows the waveforms according to the invention.

FIG. 6 shows the operations of the controller 24 during the positive and negative half cycles. The following paragraphs describe the control process of outputting a complete AC voltage using the invention. Suppose the voltage of each DC capacitor 10 and 11 approaches a DC voltage $V_{ds}$. The control of positive half cycle and negative half cycle are described as follows.

1. Control in the Positive Half Cycle of the AC Source $V_S$:

During the positive half cycle of the AC source $V_S$, the full-bridge circuit 20 should output a positive-voltage wave with three voltage levels, including the zero voltage level. During this half cycle, the controller 24 turns off the lower power electronic switch 212 of the first half-bridge circuit 21 and the upper power electronic switch 221 of the second half-bridge circuit 22.

When the voltage of AC source $V_S$ is smaller than $V_{ds}$, the power electronic switch 12 is in the off-state. The DC capacitors 10 and 11 become to be connected in parallel by the two diodes 14 and 15, thereby providing a DC voltage $V_{ds}$ on the full-bridge circuit 20. At the same time, the controller 24 outputs a high-frequency pulse width modulation (PWM) signal to the upper power electronic switch 211 of the first half-bridge switch circuit 21 so that the upper power electronic switch 211 turns on and off alternately. The lower power electronic switch 222 of the second half-bridge circuit 22 is continuously in the on-state. When the upper power electronic switch 211 is in the on-state, the full-bridge circuit 20 outputs a voltage $+V_{ds}$. When the upper power electronic switch 211 is in the off-state, the diode D2 of the lower power electronic switch 212 of the first half-bridge switch circuit 21 is turned on due to the current from the inductor of the filter circuit 23. Therefore, the full-bridge circuit 20 outputs a zero voltage.

When the voltage of AC source $V_S$ is smaller than $V_{ds}$, there is another operating scheme. The controller 24 outputs a high-frequency PWM signal to the lower power electronic switch 222 of the second half-bridge circuit 22 so that the lower power electronic switch 222 turns on and off alternately. The upper power electronic switch 211 of the first half-bridge circuit 21 is continuously in the on-state. When the lower power electronic switch 222 is in the on-state, the full-bridge circuit full-bridge circuit 20 outputs a voltage $+V_{ds}$. When the lower power electronic switch 222 is in the off-state, the diode D3 of the upper power electronic switch 221 is turned on due to the current from the inductor of the filter circuit 23. Therefore, the full-bridge circuit 20 outputs a zero voltage. In summary, when the voltage of AC source $V_S$ is in its positive half cycle and smaller than $V_{ds}$, the voltage output from the full-bridge circuit 20 alternates between the levels $+V_{ds}$ and zero.

When the voltage of AC source $V_S$ is larger than $V_{ds}$, the controller 24 outputs a high-frequency PWM signal to turn the power electronic switch 12 on and off alternately. The controller 24 further makes the upper power electronic switch 211 of the first half-bridge circuit 21 and the lower power electronic switch 222 of the second half-bridge circuit 22 continuously in the on-state. When the power electronic switch 12 is turned on, the DC capacitors 10 and 11 are connected in series, providing a DC voltage $2V_{ds}$ to the full-bridge circuit 20. The full-bridge circuit 20 thus outputs a voltage $+2V_{ds}$. When the power electronic switch 12 is turned off, the DC capacitors 10 and 11 are connected in parallel via the diodes 14 and 15, thereby providing a DC voltage $V_{ds}$ to the full-bridge circuit 20. The full-bridge circuit 20 then outputs a voltage $+V_{ds}$. When the voltage of AC source $V_S$ is in its positive half cycle and larger than $V_{ds}$, the output voltage of the full-bridge circuit 20 alternates between the voltage levels $+2V_{ds}$ and $+V_{ds}$.

In summary, when the AC source $V_S$ is in its positive half cycle, the full-bridge circuit 20 outputs a voltage wave with three levels, $+2V_{ds}$, $+V_{ds}$, and 0, according to the magnitude of the AC source $V_S$.

2. Control in the Negative Half Cycle of the AC Source $V_S$:

During the negative half cycle of the AC source $V_S$, the full-bridge circuit 20 should output a negative-voltage wave with three voltage levels, including zero voltage. During this half cycle, the controller 24 continuously turns off the upper power electronic switch 211 of the first half-bridge circuit 21 and the lower power electronic switch 222 of the second half-bridge circuit 22.

When the absolute voltage of the AC source $V_S$ is smaller than $V_{ds}$, the power electronic switch 12 is in the off-state. The DC capacitors 10 and 11 are connected in parallel by the diodes 14 and 15, thereby providing a DC voltage $V_{ds}$ on the full-bridge circuit 20. At the same time, the controller 24 outputs a high-frequency PWM signal to the lower power electronic switch 212 of the first half-bridge circuit 21 so that the lower power electronic switch 212 turns on and off alternately. The upper power electronic switch 221 of the second half-bridge circuit 22 is continuously turned on. When the lower power electronic switch 212 is turned on, the full-bridge circuit 20 outputs a voltage $-V_{ds}$. When the lower power electronic switch 212 is turned off, the diode D1 of the upper power electronic switch 211 is turned on due to the current from the inductor of the filter circuit 23. Therefore, the full-bridge circuit 20 outputs a zero voltage.

When the absolute voltage of the AC source $V_S$ is smaller than $V_{ds}$, there is another operating scheme. The controller 24 outputs a high-frequency PWM signal to the upper power electronic switch 221 of the second half-bridge circuit 22 so that the upper power electronic switch 221 turns on and off alternately. The lower power electronic switch 212 of the first half-bridge circuit 21 is continuously turned on. When the upper power electronic switch 221 is turned on, the full-bridge circuit 20 outputs a voltage $-V_{ds}$. When the upper power electronic switch 221 is turned off, the diode D4 of the lower power electronic switch 222 is turned on due to the current from the inductor of the filter circuit 23. Therefore, the full-bridge circuit 20 outputs a zero voltage. In summary, when the voltage of AC source $V_S$ is in its negative half cycle and its absolute value is smaller than $V_{ds}$, the voltage output from the full-bridge circuit 20 alternates between the levels $-V_{ds}$ and zero.

When the absolute voltage of the AC source $V_S$ is greater than $V_{ds}$, the controller 24 outputs a high-frequency PWM signal to the power electronic switch 12 so that the power electronic switch 12 turns on and off alternately. The controller 24 further makes the lower power electronic switch 212 of the first half-bridge switch circuit 21 and the upper power electronic switch 221 of the second half-bridge switch circuit 22 continuously on. When the power electronic switch 12 is turned on, the DC capacitors 10 and 11 are connected in series, providing a DC voltage $2V_{ds}$ on the full-bridge circuit 20. The full-bridge circuit 20 outputs a voltage $-2V_{ds}$. When the power electronic switch 12 is turned off, the DC capacitors 10 and 11 are connected in parallel via the diodes 14, 15, outputting a DC voltage $V_{ds}$. The full-bridge circuit 20 outputs a voltage $-V_{ds}$. Therefore, when the voltage of AC source $V_S$ is in its negative half cycle and its absolute value is greater than $V_{ds}$, the voltage output from the full-bridge circuit 20 alternates between the levels $-2V_{ds}$ and $-V_{ds}$.

In summary, when during the negative half cycle of the AC power $V_S$, the full-bridge circuit 20 outputs a voltage wave containing three voltage levels, $-2V_{ds}$, $-V_{ds}$ and 0, according to the magnitude of the AC source $V_S$.

According to the above description of the control operations during the positive and negative cycles, the five-level DC-AC converter turns the power electronic switch 12 of the capacitor set 1 on and off so that the DC capacitors 10 and 11 are selectively connected in series or parallel with the help of the two diodes 14 and 15. This provides two voltage levels to the full-bridge circuit 20. The full-bridge circuit 20 then converts the voltage into five levels of voltage, i.e. $2V_{ds}$, $V_{ds}$, 0, $-V_{ds}$ and $-2V_{ds}$, for output. Through appropriate controls, the five levels of voltage output from the full-bridge circuit 20 pass through the filter circuit 23 to generate a sinusoidal output current, which is then fed into the AC source Vs.

When the DC capacitors 10 and 11 along with the diodes 14 and 15 are equivalently in parallel, only one of the DC capacitors 10 and 11 that has the higher voltage will provide power to the full-bridge circuit 20 when their voltages are different. The one with a lower voltage does not provide power. This results in a voltage drop on the DC capacitor with the higher voltage. The DC capacitors 10 and 11 will automatically reach the same voltage without the need of an extra control circuit. In comparison with other multi-level DC-AC converters, the five-level DC-AC converter of the invention is superior in balancing the voltages of the DC capacitors thereof. In comparison with other five-level DC-AC converter, the five-level DC-AC converter of this invention only uses two diodes and five power electronic switches. This greatly simplifies the power circuit and reduces the production cost. The controller indeed only needs to control the five power electronic switches to convert DC power into AC power with five levels of voltage. Accordingly, the invented five-level DC-AC converter has advantages of the simple circuit, low component cost and simplified control method in balancing the voltages of the DC capacitors.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A five-level DC-AC converter comprising:
a capacitor set having two ends as a positive terminal and a negative terminal of a DC bus, and including two DC capacitors, only one power electronic switch and two diodes;
a full-bridge circuit connected between the positive terminal and the negative terminal of the DC bus and including a first half-bridge circuit and a second half-bridge circuit connected in parallel; and having an AC power output port connected to AC source, and
a controller connected to the capacitor set and the full-bridge circuit, controlling the capacitor set to provide a voltage with two levels to the full-bridge circuit; and controlling the full-bridge circuit to further convert to an output voltage with five levels.

2. The five-level DC-AC converter as claimed in claim 1, wherein the two DC capacitors of the capacitor set are connected in series through the power electronic switch and connected between the positive terminal and the negative terminal of the DC bus; an anode of one of the diodes is connected to a serial connection node at which the power electronic switch and one of the DC capacitors are connected together, and a cathode of the one of the diodes is connected to the positive terminal of the DC bus; and an anode of the other diode is connected to the negative terminal of the DC bus, and a cathode of the other diode is connected to another serial connection node at which the power electronic switch and the other DC capacitor are connected together.

3. The five-level DC-AC converter as claimed in claim 2, wherein the controller controlling the power electronic switch of the capacitor set 1 on and off so that the two DC capacitors and are selectively connected in series or parallel with the help of the two diodes.

4. The five-level DC-AC converter as claimed in claim 1, wherein the first half-bridge circuit and the second half-bridge circuit respectively comprises an upper power electronic switch and a lower power electronic switch connecting in series; the two serial connection nodes of the upper power electronic switch and the lower power electronic switch of the first half-bridge circuit and the second half-bridge circuit are further connected to the AC power output port through a filter circuit.

5. The five-level DC-AC converter as claimed in claim 4, wherein the filter circuit is a first-order low-pass filter.

6. The five-level DC-AC converter as claimed in claim 4, wherein the filter circuit is a second-order low-pass filter.

7. The five-level DC-AC converter as claimed in claim 1, wherein each of the power electronic switches is an IGBT, MOSFET or controllable power electronic switch.

8. The five-level DC-AC converter as claimed in claim 1, wherein the two DC capacitors have the same capacitance and each of the two DC capacitors provides a DC voltage $V_{ds}$.

9. The five-level DC-AC converter as claimed in claim 1, wherein during a positive half cycle of the AC source, the lower power electronic switch of the first half-bridge circuit and the upper power electronic switch of the second half-bridge switch circuit are turned off;
when the voltage of AC source is smaller than the DC voltage $V_{ds}$, the power electronic switch of the capacitor set is continuously off and the two DC capacitors are connected in parallel by the two diodes, thereby providing a DC voltage $V_{ds}$ to the full-bridge circuit; either the upper power electronic switch of the first half-bridge circuit or the lower power electronic switch of the second half-bridge circuit is controlled by a pulse width modulation (PWM) signal while the other is continuously on, rendering the full-bridge circuit to have an output voltage alternating between the DC voltage $V_{ds}$ and zero voltage;
when the voltage of AC source is greater than the DC voltage $V_{ds}$, the power electronic switch of the capacitor set is controlled by a PWM signal and the upper power electronic switch of the first half-bridge circuit and the lower power electronic switch of the second half-bridge circuit are continuously turned on so that the full-bridge circuit provides the output voltage alternating between a doubled DC voltage $2V_{ds}$ and the DC voltage $V_{ds}$.

10. The five-level DC-AC converter as claimed in claim 1, wherein during a negative half cycle of the AC source the upper power electronic switch of the first half-bridge circuit and the lower power electronic switch of the second half-bridge circuit are turned off;
when an absolute voltage of the AC source is smaller than the DC voltage $V_{ds}$, the power electronic switch of the capacitor set is turned off and the two DC capacitors are connected in parallel by the two diodes, thereby providing the DC voltage $V_{ds}$ to the full-bridge circuit; either the lower power electronic switch of the first half-bridge circuit or the upper power electronic switch of the second half-bridge circuit is controlled by a PWM signal while the other is continuously turned on, rendering the output voltage of the full-bridge circuit to alternate between a negative DC voltage $-V_{ds}$ and zero voltage;
when the absolute voltage of the AC source is greater than the DC voltage $V_{ds}$, the power electronic switch of the capacitor set is controlled by a PWM signal and the lower power electronic switch of the first half-bridge circuit and the upper power electronic switch of the second half-bridge circuit are turned on so that the output voltage of the full-bridge circuit alternate between a doubled negative voltage $-2V_{ds}$ and the negative DC voltage $-V_{ds}$.

* * * * *